United States Patent [19]
Waczynski et al.

[11] Patent Number: 6,064,054
[45] Date of Patent: May 16, 2000

[54] SYNCHRONOUS DETECTION FOR PHOTOCONDUCTIVE DETECTORS

[75] Inventors: Augustyn Waczynski; Richard L. Wiggins, both of Indiana, Pa.

[73] Assignee: Diasense, Inc., Pittsburgh, Pa.

[21] Appl. No.: 09/011,291

[22] PCT Filed: Aug. 21, 1996

[86] PCT No.: PCT/US96/13684

§ 371 Date: Apr. 27, 1998

§ 102(e) Date: Apr. 27, 1998

[87] PCT Pub. No.: WO97/07529

PCT Pub. Date: Feb. 27, 1997

Related U.S. Application Data

[60] Provisional application No. 60/002,555, Aug. 21, 1995.
[51] Int. Cl.[7] .................................................. H01J 40/121
[52] U.S. Cl. ..................................... 250/214 R; 250/336.1
[58] Field of Search ......................... 250/214 R, 214 LA, 250/214 C, 208.1, 208.2, 206, 336.1, 338.1, 338.4, 339.01, 339.02, 341.5, 214 B, 205

[56] References Cited

U.S. PATENT DOCUMENTS

| | | | |
|---|---|---|---|
| 4,109,114 | 8/1978 | Baer et al. | 250/214 B |
| 4,464,048 | 8/1984 | Farlow | 250/214 B |
| 4,518,253 | 5/1985 | Takahashi | 250/214 B |
| 4,535,232 | 8/1985 | Elliott et al. . | |
| 4,551,623 | 11/1985 | Elliott et al. . | |
| 4,681,432 | 7/1987 | Kawabata et al. | 250/214 B |
| 4,814,602 | 3/1989 | Imura | 250/205 |
| 5,126,555 | 6/1992 | Hawryluk | 250/214 B |

*Primary Examiner*—John R Lee
*Attorney, Agent, or Firm*—Webb Ziesenheim Logsdon Orkin & Hanson, P.C.

[57] ABSTRACT

Disclosed is a radiation detector which includes a photoconductive detector and a modulator which modulates radiation passing to the photoconductive detector from a radiation source. An AC bias source is connected to the photoconductive detector and provides at least two levels of bias thereto. The modulator supplies synchronization signals to the AC bias source such that the level of bias supplied to the photoconductive detector is synchronized to the modulation of the radiation by the modulator. An integrator is connected to and receives an output signal generated by the photoconductive detector.

20 Claims, 2 Drawing Sheets

SYNCHRONOUS DETECTION FOR PHOTOCONDUCTIVE DETECTORS

CROSS REFERENCE TO RELATED APPLICATION

This application claims priority to U.S. Provisional Patent Application Ser. No. 60/002,555, filed on Aug. 21, 1995, entitled "Synchronous Detection with a Photoconductive Detector and Its Application to Combining Many Photoconductive Detectors in a Compact Package".

BACKGROUND OF THE INVENTION

1. Field of the Invention

This invention relates to detectors and, more particularly, to the biasing of photoconductive detectors.

2. Background Art

The use of photoconductive detectors for measuring radiation is well-known. Because of their high sensitivity, photoconductive detectors such as PbS and PbSe are particularly effective in measuring infrared radiation. Detection of infrared radiation is used by the military for tracking warm vehicles and in night vision devices, is used by medical instrument manufacturers for measuring glucose and other body constituents in a noninvasive manner and is used by scientific instrument manufacturers for measuring chemical composition and structure.

In general, the resistance of the photoconductive detector changes when the radiation falls on its surface. Resistance changes can be measured as an electrical signal change and the intensity of the detected radiation can be estimated by the magnitude of resistance change.

Photoconductive detectors typically require a bias current or voltage to operate, such as a direct current bias. The sensitivity of the detector is proportional to the magnitude of the applied bias. It is preferred to supply a high bias to such a detector to increase its sensitivity and to overcome the noise of the electronics associated with the detector in an overall detection system.

The bias voltage applied to a photoconductive detector also causes current to flow in the absence of incident radiation. This current, referred to as the "dark current" or "dark signal", is usually large when compared to the current changes resulting from incident radiation. The detection of the small, radiation related signal, which is added to the large, dark signal, is often difficult. The electronics used with a photoconductive detector are designed to separate the desired radiation related signal from the undesired dark signal. The radiation related signal is usually a periodically modulated signal which can be separated from the DC dark signal with a DC blocking element such as a capacitor. In addition, the electronics used with a photoconductive detector are usually designed to improve the signal-to-noise ratio of the raw signal that is generated by the photoconductive detector. This signal-to-noise ratio can be improved by electronics that detect only the narrow band of frequencies of the radiation related signal while rejecting all other frequencies. As noise is spread across all frequencies, detecting only a narrow band of frequencies reduces that noise. A common method of reducing this noise is by the use of a lock-in amplifier, which is also referred to as a synchronous detector. This method can result in a DC output signal that is proportional to the magnitude of the radiation related input signal.

It is common to use a plurality of photoconductive detector elements, also referred to as pixels, in the form of a linear array mounted on a common substrate to measure radiation across a spectrum of wavelengths. Each detector element is responsive to and detects a particular wavelength, or band of wavelengths, of radiation. In applications such as infrared scanners and cameras, it is a goal to integrate as many photoconductive detector elements and their associated electronics into a single compact package. In such an arrangement, the synchronous detection method discussed above has not been used because the large number of electronic components needed to implement this method cannot be readily placed on a single package. For such synchronous detection, each photoconductive detector element requires a high pass filter, a preamplifier, a multiplier and an integrator. A multiplexer would typically follow the integrators so that the plurality of photoconductive detector elements would supply their DC output signals to an overall detection system through a single output pin.

One prior art method used for integrating a number of photoconductive detector elements and electronics into a compact package includes a dark signal subtraction circuit and a preamplifier for each detector element. Noise reduction methods are then applied external to the package. In applications where it is desired to integrate a plurality of photoconductive detector elements and electronics into a compact package, lock-in amplification has not been used. At the modulation frequencies used with typical photoconductive detector elements, the blocking capacitor must be large. For such lock-in amplification, each photoconductive detector element requires two amplifiers and a multiplexer. This arrangement results in a rather large component count for a compact package and is has not been used. Rather, the prior art has used the subtraction of the dark signal followed by amplification and integration and then multiplexing of the integrated signal from several detector elements to one output.

It is an object of the present invention to provide a synchronous photoconductive detection system which reduces the number of components needed for the overall system so that a system with a plurality of detector elements and associated electronics can be included on a single compact package and provide multiplexing of the signals generated by the detector elements.

SUMMARY OF THE INVENTION

In the present invention, the normal DC bias applied to a photoconductive detector is replaced with an AC bias voltage which is synchronized with the modulation of the radiation impingement upon the detector. The detector itself then becomes a multiplier in a synchronous detection system. The signal developed by the detector, including both the dark signal and the radiation related signal, is supplied to an integrator. All AC signals, including noise, that are not synchronous with the modulation are rejected by the integrator. With this bias arrangement, the dark signal is an AC signal which is rejected by the integrator. The electronics needed for synchronous detection with this invention are reduced to a single integrator. This invention provides all of the advantages of synchronous detection, including rejection of the dark signal, reduction of noise, and conversion of the AC signal related to radiation to an easily multiplexed DC signal related to the radiation. The reduction of components from this invention reduces the cost of the electronics used with the detector and allows many detector elements, each with synchronous detection, to be combined into a compact package.

In the simplest form of the present invention, a positive bias is applied to the detector when radiation is present on the detector and a negative bias is applied to the detector when no radiation is present on the detector. The integrator, which receives the output from the detector, charges with both the current relating to the radiation and the dark current during the period that the radiation is on the detector and then the integrator discharges based upon the dark current only during the period when no radiation is on the detector. The net result is that the integrated signal is related only to the radiation impinging on the detector.

In this invention, the gain of the conversion from a radiation related current signal to a DC voltage signal is determined by the size of an integrating capacitor and the time of integration. The integrating capacitor can be selected to provide a general range and the integration time can be programmed to fit the specific signal level. The integration time also determines the bandwidth of the AC filtering and, therefore, the amount of noise rejection. The integration time can be easily programmed to fit specific noise reduction requirements. Since the net result of the integrator is a generation of a DC signal relating to the detected radiation, this DC signal is easily multiplexed using standard methods and circuits. Multiplexing reduces the pins needed on an overall package and contributes to the overall compact size of a system including a plurality of detector elements. The close proximity of the electronics to the detector elements and the inclusion of the electronics and detector elements within a single shielded package reduce the susceptibility of the overall radiation detection system to electromagnetic interference.

The AC bias voltage supplied to the photoconductive detector may have three states—positive, negative and zero, where the positive and negative biases may be different in both sign and magnitude. The use of a zero bias voltage can reduce the effects of modulator instability and permit the selection of particular periods of radiation or darkness on the detector. The magnitudes and durations of the positive and negative biases can be selected so that the integrated dark current is zero, regardless of the relative times of the illumination and dark periods.

BRIEF DESCRIPTION OF THE DRAWINGS

FIGS. 2A, 2B1, 2B2, 2C, 2D, 2E, 2F, and 2G are graphs showing waveforms generated by the system shown in FIG. 1.

DESCRIPTION OF THE PREFERRED EMBODIMENT

Figure 1:
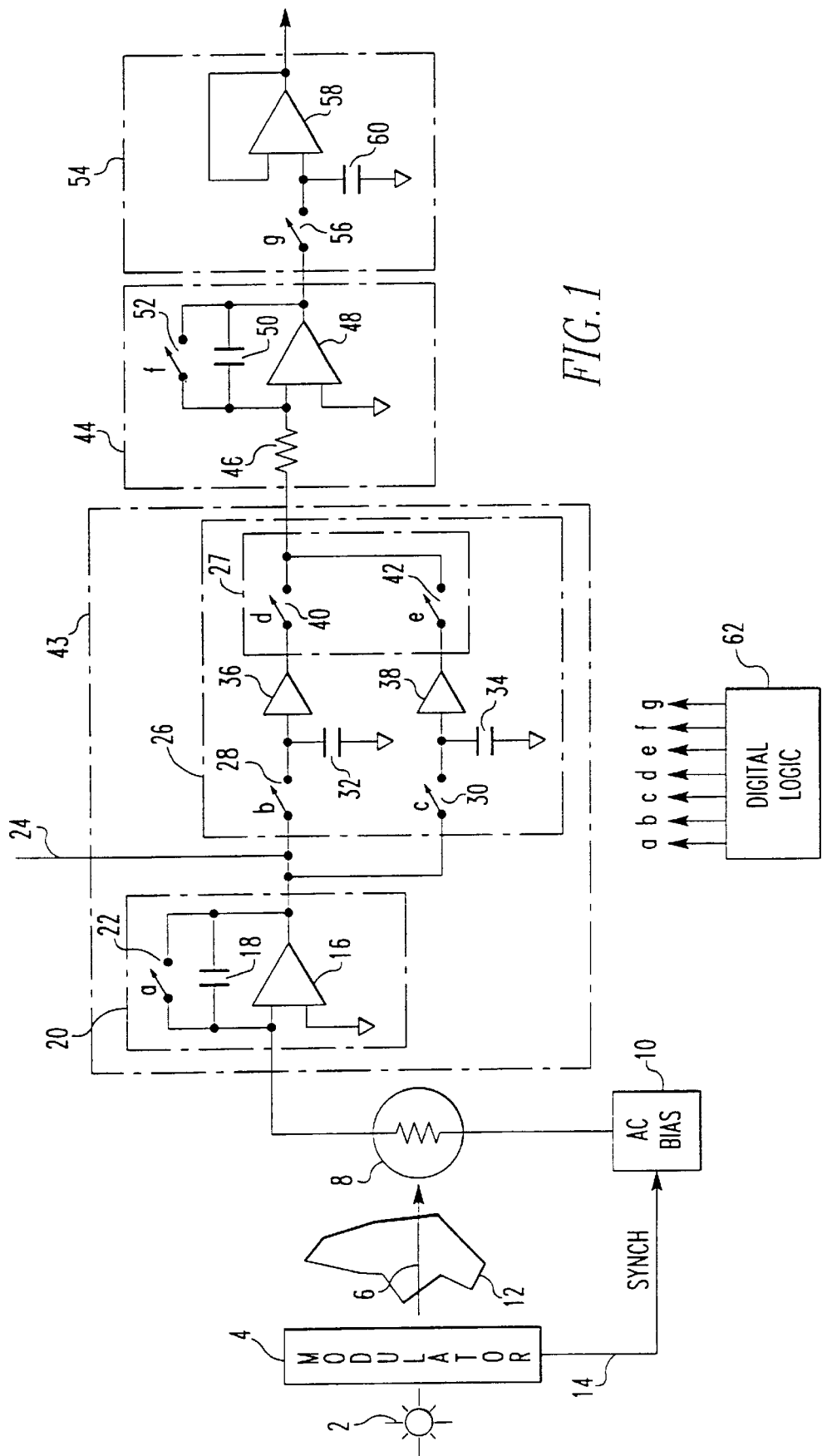
FIG. 1 is a schematic diagram of a detector system using the synchronous biasing of the present invention.
Figure 2A:
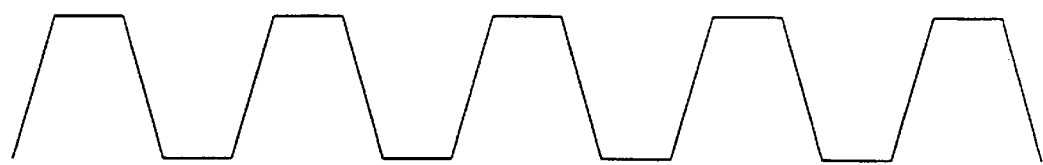
Figure 2C:
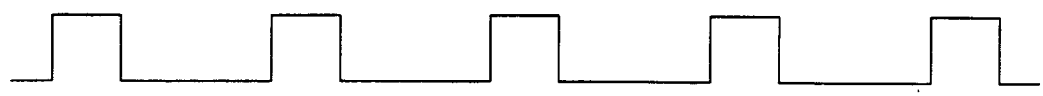
Figure 2C:
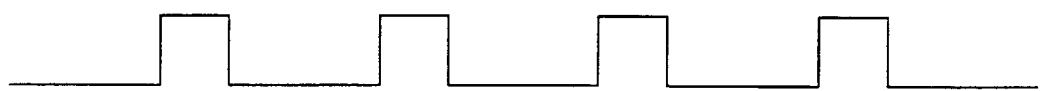
Figure 2C:
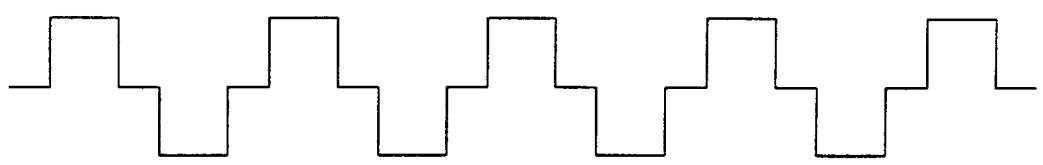
Figure 2D:
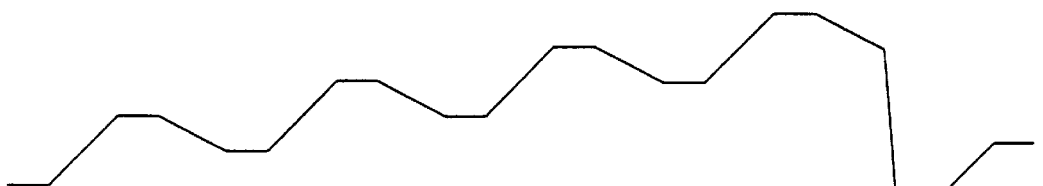
Figure 2E:
Figure 2F:
Figure 2G:

A preferred embodiment of a radiation detection system including the improvements of the present invention is shown in FIG. 1. Radiation from a radiation source 2, such as an infrared radiation source, is modulated in a square wave (on-off) manner by an optical modulator 4. A rotating slotted disk is one method of performing this square wave radiation modulation. It is to be recognized that square wave modulation of the radiation is not essential to the present invention. Other modulation techniques, including triangular, sinusoidal and trapezoidal modulations, could work equally well. The modulation could also be the variation in light intensity that results from scanning over a scene or over a range of spectral wavelengths. The modulation may also be timed to select some particular parts of a scene or spectral region and the modulation might take the form of a Hadamard sequence.

The radiation 6 from the modulator 4 is directed to and impinges upon a photoconductive detector 8. The detector 8 could be formed of a material suited for detecting infrared radiation, such as PbS or PbSe. The detector 8 could also be associated with other similar detectors in a linear array mounted on a common substrate. One end of the detector 8 is connected to an AC bias source 10. The modulated radiation 6 could undergo an interaction related to a particular material 12 through which the modulated radiation 6 travels. The radiation 6 then impinges upon the detector 8 which generates an electrical signal related to the radiation 6.

A synchronization signal 14 supplied by the modulator 4 to the AC bias source 10 indicates when the modulated radiation 6 is "on", "off" or "neither". The "neither" condition indicates, for example, when the modulated radiation 6 is present but is of a value that is not important or desirable to measure in the overall system. An important characteristic of the electrical synchronization signal 14 in particular and of the radiation modulation in general is that the mean value of the dark signal during the "on" time, when subtracted from the mean value of the dark signal during the "off" time is near zero during the integration time.

In this preferred embodiment, the detector 8 is biased by the AC bias source 10, under control of the synchronization signal 14, according to the following: the bias is a DC voltage of one polarity when the radiation is present, or "on", the bias is a DC voltage of the opposite polarity when the radiation is not present, or "off", and the bias is zero when the radiation is changing between the on and off states. If the on and off times are chosen to be equal, then the magnitude of the applied bias is independent of its polarity. A typical implementation of the AC bias would consist of a stable reference voltage supply, a precision inverter that generates the opposite polarities of bias, and a multiplexer that selects one of the three bias states. If the on and off times of the modulated radiation 6 are unequal, then the magnitude of the bias voltage would be selected so that the integrated value of the dark signal is zero.

The signal from the detector 8 is supplied by the other end of the detector 8 to a first input terminal of amplifier 16. The other input terminal of amplifier 16 is grounded. Capacitor 20 extends between the output terminal and the first input terminal of amplifier 16. This arrangement of amplifier 16 and capacitor 18 forms a charge integrator 20 which processes the signal received from the detector 8. Switch 22 is connected across capacitor 18 and is used in connection with the removal of kTC noise from the charge integrator 20 as discussed hereinafter.

The voltage from the charge integrator 20 could be read directly at output terminal 24. As shown in FIG. 1, the output of the charge integrator 20 is passed to a correlated double sample and hold circuit 26 which removes the kTC noise of the charge integrator 20. Sample and hold circuit 26 includes a multiplexer 27 at its output end. In the arrangement shown in FIG. 1, sample and hold circuit 26 contains parallel channels which include, respectively and in order, switches 28 and 30, capacitors 32 and 34, amplifiers 36 and 38 and switches 40 and 42. The multiplexer 27 includes switches 40 and 42. The elements included in the charge integrator 20 and in sample and hold circuit 26, identified in FIG. 1 collectively by reference number 43, are available in model RL0064MBD-001 Amplifier-Multiplexer Array Chip manufactured by EG&G Reticon, Sunnyvale, Calif.

The output from sample and hold circuit 26 is, in the arrangement shown in FIG. 1, supplied to a high speed integrator 44 which completes the correlated double sampling by converting the differential signal into a ground referred, single signal, proportional to the radiation impinging on detector 8. The high speed integrator 44 includes resistor 46 which supplies the output of sample and hold circuit 26 to a first input terminal of amplifier 48. The other input terminal of amplifier 48 is grounded. Capacitor 50 extends between the output terminal and the first input terminal of amplifier 48. Switch 52 is connected across capacitor 50. The output of the high speed integrator 44 is supplied to sample and hold circuit 54 which holds the signal for analog-to-digital conversion. Sample and hold circuit 54 includes a switch 56 which passes the output from amplifier 48 of the high speed integrator 44 to a first input terminal of amplifier 58. The first input terminal of amplifier 58 is also connected through capacitor 60 to ground. The output terminal of amplifier 58 in sample and hold circuit 54 is connected to the other input terminal thereof in a feedback loop.

A digital logic circuit 62 generates control signals, identified by arrows "a", "b", "c", "d", "e", "f" and "g", which are supplied to and control the operation of normally open switches 22, 28, 30, 40, 42, 52 and 56, respectively, in FIG. 1. These control signals are used to control the integration and readout operations in the circuit shown in FIG. 1. The digital logic circuit 62 could include a microcontroller.

FIG. 2 shows the various timing signals and the like during normal data acquisition of the circuit shown in FIG. 1. The modulated radiation 6 is shown in graph A, with the transitions from the radiation to no radiation states represented by a sloped line rather than the vertical line which would be shown in a true square wave. The synchronization signals 14 for the states of radiation and no radiation and "neither" are shown in graphs B1 and B2, respectively. The resulting AC bias signal generated by AC bias source 10 under control of the synchronization signals 14 and supplied to the photoconductive detector 8 is shown in graph C.

The charging of the charge integrator 20 is shown in graph D. At the end of one or a plurality of cycles of radiation modulation, the integrated charge is transferred to the sample and hold circuit 26 at a time set by the trigger shown at graph E. The trigger in graph E represents the quick closing and opening of, for example, switch 30 which transfers the charge on capacitor 18 in the charge integrator 20 to capacitor 34 in one channel of sample and hold circuit 26. This action is the actual reading of the signal generated by the charge integrator 20. The trigger in graph F, which takes place immediately following the trigger in graph E, represents the quick closing and opening of switch 22 in the charge integrator 20. By closing switch 22, capacitor 18 should be fully discharged for a subsequent measurement cycle. Before beginning the next measurement cycle and immediately following the opening of capacitor 18 through the trigger in graph F, switch 28 is quickly closed and then opened. This action is represented by the trigger in graph G. By this action, any charge remaining on capacitor 18 is transferred to capacitor 32 in the other channel of sample and hold circuit 26. By reading any remaining charge on capacitor 18 very close following the reading of the desired signal on capacitor 18, the noise from capacitor 18 itself will be stored on capacitor 32. Triggers E, F and G preferably take place in a time period while the bias (graph C) is at a zero volt level representing the "neither" radiation modulation state. Thereafter, while the next measurement cycle is running, i.e., during further integration by the charge integrator 20 after bias is applied once again to the detector 8, switches 40 and 42 are closed, in turn, and the signals of the two channels of sample and hold circuit 26 are transferred, one channel at a time, through the high speed integrator 44 to sample and hold circuit 54. The signal from one channel includes the desired radiation signal plus kTC noise from capacitor 18. The signal from the other channel includes only kTC noise from capacitor 18. By subtracting these two signals, the kTC noise from capacitor 18 can be separated from the desired radiation signal.

Having described above the presently preferred embodiment of the present invention, it is to be understood that the invention may be otherwise embodied within the scope of the appended claims.

We claim:

1. A method of biasing a photoconductive detector to obtain synchronous detection, said method comprising the steps of:
    a) modulating radiation passing from a radiation source to a photoconductive detector,
    b) applying an AC bias to the photoconductive detector in a manner which is synchronized with the modulation of the radiation passing to the photoconductive detector, and
    c) integrating an output signal generated by the photoconductive detector over a predetermined time period.

2. The method of claim 1 wherein the modulation of the radiation includes at least on and off modulation.

3. The method of claim 1 wherein the modulation of the radiation is a square wave modulation.

4. The method of claim 2 wherein the AC bias includes a first DC voltage of a particular polarity which is applied to the photoconductive detector when radiation is passing to the photoconductive detector and wherein the AC bias includes a second DC voltage at a polarity opposite that of the first DC voltage which is applied to the photoconductive detector when no radiation is passing to the photoconductive detector.

5. The method of claim 4 wherein the AC bias is at a zero volt level when the radiation passing to the photoconductive detector is present but is less than a particular level of radiation.

6. The method of claim 4 wherein the magnitude and duration of the first and second DC voltages are selected such that integration of the output signal generated by the photoconductive detector is zero when no radiation is passing to the photoconductive detector.

7. A radiation detector comprising a photoconductive detector, a modulator which modulates radiation passing to said photoconductive detector from a radiation source, an AC bias source connected to the photoconductive detector and providing at least two levels of bias thereto, with the modulator supplying synchronization signals to the AC bias source such that the level of bias supplied to the photoconductive detector is synchronized to the modulation of the radiation by the modulator, and an integrator connected to and receiving an output signal generated by the photoconductive detector.

8. The radiation detector of claim 7 wherein the modulator provides at least on and off modulation of the radiation.

9. The radiation detector of claim 8 wherein the modulator provides square wave modulation of the radiation.

10. The radiation detector of claim 8 wherein the modulator is a rotating slotted disk.

11. The radiation detector of claim 8 wherein the AC bias source provides, under control of the synchronization signals, a first DC bias voltage at a particular polarity to the photoconductive detector when the modulator passes radiation to the photoconductive detector and wherein the AC bias source provides a second DC bias voltage at the opposite polarity to the photoconductive detector when the modulator passes no radiation to the photoconductive detector.

12. The radiation detector of claim 11 wherein the AC bias source additionally provides, under the control of the synchronization signals, an AC bias to the photoconductive detector at zero volts when the modulator passes radiation to the photoconductive detector at less than a predetermined level and greater than no radiation.

13. The radiation detector of claim 7 wherein the integrator is a charge integrator including an amplifier and a charge capacitor.

14. The radiation detector of claim 13 further including a noise reduction circuit attached to an output of the charge integrator and configured to eliminate kTC noise generated by the charge capacitor.

15. A radiation detector comprising a plurality of separate photoconductive detector elements arranged on a substrate in a linear array, a modulator which modulates radiation passing to each detector element from a radiation source, an AC bias source connected to each detector element and providing at least two levels of bias thereto, with the modulator supplying synchronization signals to the AC bias source such that the level of bias supplied to each detector element is synchronized to the modulation of the radiation by the modulator, and a separate integrator connected to and receiving an output signal generated by each detector element.

16. The radiation detector of claim 15 wherein the modulator provides at least on and off modulation of the radiation.

17. The radiation detector of claim 16 wherein the modulator provides square wave modulation of the radiation.

18. The radiation detector of claim 16 wherein the AC bias source provides, under control of the synchronization signals, a first DC bias voltage at a particular polarity to the detector elements when the modulator passes radiation to the detector elements and wherein the AC bias source provides a second DC bias voltage at the opposite polarity to the detector elements when the modulator passes no radiation to the detector elements.

19. The radiation detector of claim 18 wherein the AC bias source additionally provides, under the control of the synchronization signals, an AC bias to the detector elements at zero volts when the modulator passes radiation to the detector elements at less than a predetermined level and greater than no radiation.

20. The radiation detector of claim 15 wherein the integrator is a charge integrator including an amplifier and a charge capacitor.

* * * * *